United States Patent [19]

Gray

[11] Patent Number: 4,749,479
[45] Date of Patent: Jun. 7, 1988

[54] APPARATUS FOR SEPARATION OF LIQUIDS AND SOLIDS USING FABRICS

[75] Inventor: Lew T. Gray, Greer, S.C.

[73] Assignee: Phillips Petroleum Company, Bartlesville, Okla.

[21] Appl. No.: 600,256

[22] Filed: Apr. 13, 1984

Related U.S. Application Data

[62] Division of Ser. No. 382,273, May 26, 1982, abandoned.

[51] Int. Cl.$^4$ ............... B01D 29/08; B01D 33/30; C02F 11/12
[52] U.S. Cl. .................. 210/170; 210/265; 210/237; 210/211; 210/505; 210/901
[58] Field of Search ............. 210/170, 265, 359, 508, 210/901, 291, 172, 237, 747, 269, 503, 505; 405/36, 43, 45, 128, 129, 74

[56] References Cited

U.S. PATENT DOCUMENTS

| | | | |
|---|---|---|---|
| 224,398 | 2/1880 | Currie | 405/74 |
| 553,424 | 1/1896 | Ricks | 210/170 |
| 2,715,466 | 8/1955 | Esposito, Jr. | 210/777 |
| 2,900,896 | 8/1959 | Bondanini | 210/359 |
| 3,137,228 | 6/1964 | Elow | 99/287 |
| 3,351,205 | 11/1967 | Butler et al. | 210/400 |
| 3,510,005 | 5/1970 | Butler et al. | 210/400 |
| 3,764,525 | 10/1973 | Goodman et al. | 210/407 X |
| 3,908,385 | 9/1975 | Daniel et al. | 405/37 |
| 3,960,719 | 6/1976 | Bresson | 210/508 X |
| 4,023,506 | 5/1977 | Robey | 405/43 X |
| 4,039,451 | 8/1977 | Smith | 210/265 X |
| 4,063,386 | 12/1977 | Tramier | 47/58 |
| 4,222,877 | 9/1980 | Silva | 210/411 |
| 4,252,462 | 2/1981 | Klingle et al. | 210/170 |
| 4,279,760 | 7/1981 | Yamamoto | 210/784 |
| 4,344,722 | 8/1982 | Blasis | 405/128 X |
| 4,352,601 | 10/1982 | Valiga et al. | 405/128 X |

FOREIGN PATENT DOCUMENTS 1603517 11/1981 United Kingdom .

OTHER PUBLICATIONS

Dickey, George D., *Filtration*, Reinhold Pub. Corp. N.Y., 1961, pp. 143–160.
U.S. Dept. of Commerce, Patent Office Academy, Topic 7d, Formality Term List, 1977, Two pages.
Morris, William, *The American Heritage Dictionary*, Houghton Mifflin Co., 1976, p. 1317.

*Primary Examiner*—Richard V. Fisher
*Assistant Examiner*—Linda Evans
*Attorney, Agent, or Firm*—Williams, Phillips & Umphlett

[57] ABSTRACT

Liquids can be separated from the solids contained in slurries, sludges, etc. by forcing a liquid-permeable fabric, downward into the slurry so that solid materials are retained below the liquid-permeable fabric and liquids can be pumped or drained from above the liquid-permeable fabric. Apparatus is provided, comprising liquid-permeable fabrics and weighting means.

28 Claims, 4 Drawing Sheets

APPARATUS FOR SEPARATION OF LIQUIDS AND SOLIDS USING FABRICS

This application is a division of application Ser. No. 382,273 filed May 26, 1982 now abandoned.

This invention concerns separation of liquids from solid materials using fabrics.

BACKGROUND OF THE INVENTION

Filtration is a common means for extracting solids from liquids, usually involving forcing a slurry or mixture of solids and liquids through filtering materials. A slurry is usually taken to mean a watery suspension or mixture of insoluble solids in a liquid. As used herein, the term will encompass mixtures or suspensions of solid materials comprising particulate matter, gels, sludges and the like, which are at least partially insoluble in a liquid component comprising water, liquid organic or inorganic materials, and mixtures thereof. As used herein, such slurries can contain solids in suspension, or tending to settle naturally with time. Normally the filtrate or liquid passes downward through the filter with the solids remaining on the filter for recovery.

In many industries, e.g., the mining, oils and chemicals, wood pulp and agricultural industries, unfiltered waste slurries of liquids and solids are impounded in dammed earthen areas or "settling ponds". A settling pond is taken to be any concave depression in the ground, lined or unlined, which is used to collect slurries of solids and liquids. Generally such slurries are collected in settling ponds for separation, disposal or other processing. It is desirable to minimize the area of these settling ponds, to maximize disposal rates of slurries, and eventually to reclaim the areas by means including landfills and the like. However, often these areas never dry nor solidify, since evaporation is slow, and the slurried or flocculated solids never settle sufficiently so that the liquids can be pumped off. Effective means for dewatering such settling ponds without removing the sediment or settled solids are thus desirable. Similarly, it is desirable to have effective means for separating the liquid from a contained slurry of solids and liquids in general.

SUMMARY OF THE INVENTION

It is an object of this invention to provide effective means for separating the liquid from a contained slurry of solids and liquids. It is another object of this invention to provide effective means for separating the solids and liquids in settling ponds as described above. It is a further object to separate liquids from slurries of solids and liquids in settling ponds in a way such that the solids remain in the pond and the liquids are removed therefrom. It is a still further object to remove liquids from the slurries in such ponds free from suspended material, undesired colors, etc. It is a further object to provide a process for separation of liquids from slurries of solids and liquids in such a way that the filtering means utilized can be left in place atop the separated solids as part of a landfill or other waste pile. It is a further object to control the channels by which said liquids can be removed from the slurry material when they are covered by filtering means. It is another object to provide a process for covering the filtering means left in place atop separated solids with earth or other materials to form part of a landfill. A still further object is to provide a method and apparatus for the separation of liquids from slurries contained in vessels for industiral or laboratory use.

In accordance with this invention, these and other objects can be accomplished by placing a liquid-permeable fabric atop a contained slurry of solids and liquids, then causing it to sink such that the fabric effectively covers and confines the solids which were contained in the slurry, so that the liquid is filtered and separated above said fabric. In one embodiment of the invention, the liquid can then be removed by pumping, draining, decanting, evaporation or the like, leaving the separated and dewatered solids beneath said fabric. This process is distinct from conventional filtering methods, and from, e.g., land-fill operations as described in GB Pat. No. 1,603,517, wherein hydraulic fill material is deposited in a water-filled cavity atop multiple layers of "prefabricated consolidation blankets" to fill the cavity and displace the liquid therefrom.

In a preferred embodiment, the fabric of this invention is weighted by a layer of aggregate spread on its upper side, which also provides a porous channel through which the liquids can be drained or otherwise extracted. For example, in one embodiment the liquid can be drained or pumped out by means placed in the aggregate layer, preferably perforated tubes. Such a layer of aggregate can be covered with a second layer of fabric and/or a layer of clay, thus forming a laminate. Liquids can thus be separated from a contained slurry and removed without adding more slurry or solids, and without significant spillage beyond the containment area, if desired. Examples of containment areas to which this invention is applicable include natural and artificial cavities or depressions in the earth or masses of granular material, structures resembling swimming pools or tanks, and industrial or laboratory vessels of various sizes.

Methods and apparatus are thus provided for the separation of liquids from a contained slurry of liquids and solids.

These and other objects, features and advantages of this invention will be apparent to those skilled in the art from the following detailed description, the drawing, and the appended claims.

DESCRIPTION OF THE PREFERRED EMBODIMENTS

A preferred embodiment is discussed with reference to FIGS. 1 and 2.

Figure 1:
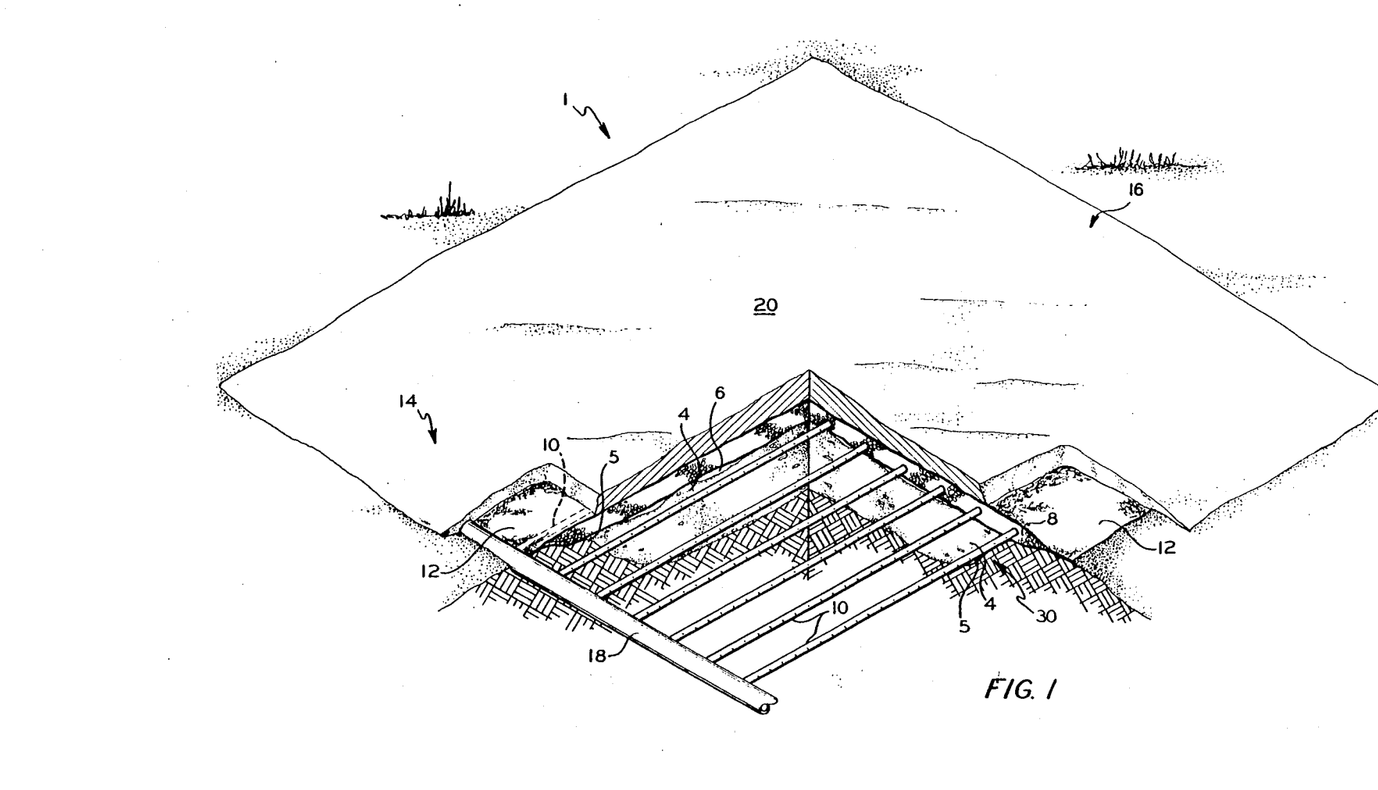
FIG. 1 is a fragmental isometric view of a preferred embodiment of the invention as applied to a settling pond.

In FIG. 1 an overall picture of a preferred embodiment of the invention is given. A settling pond 1 with an earthen floor 2, which can have a liner (not shown)

containing a slurry 30 composed of solids 4 and liquids 6, is being dewatered. Said slurry is covered with a sandwich comprising non-woven fabric and aggregate generally shown by reference numeral 8, said sandwich 8 being shown more clearly in FIG. 2, having perforated tubes 10 extending through the aggregate layer thereof. The non-woven fabric layers merge along the edge 12 and extend a distance past the edge 5 of the settling pond 1 to totally enclose the aggregate layer 32. Along opposing sides 14 and 16 said merged fabric 12 and perforated tubes 10 are in fluid connection with a common manifold pipe 18 for removing the filtered liquid. A non-permeable layer of clay 20 is laid over the sandwich 8, the manifold 18 and the settlin pond 1, also extending a distance beyond the edge 5 of said pond 1, common manifold pipe 18 and the non-woven merged fabric edge 12 to render the entire system essentially sealed from the external environment. This extension of sealant also effectively contains all liquids and solids within the system. In operation the weight of the clay 20 and aggregate sandwich 8 exert a downward force on the slurry of solids 4 and liquids 6, causing the liquid 6 to filter through the non-woven fabric into the aggregate section of the sandwich 8. Said liquid 6 is then removed by the wicking action of the non-woven material and/or draining or pumping, using the perforated tubes 10, both being tied to a manifold 18 removal means for purification, disposal or recycling. The pond 1 and clay cover layer 20 are impervious to the liquid, and thus the system tends to prevent contamination of ground or air.

Figure 2:
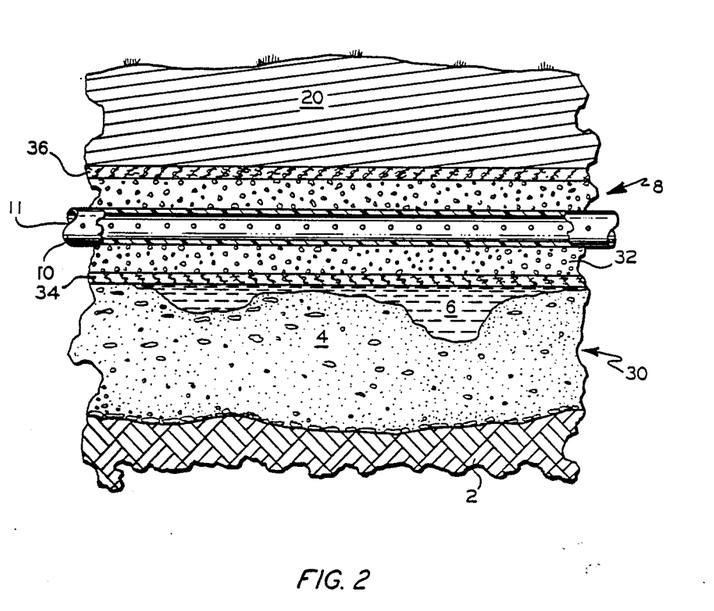
FIG. 2 is a fragmental cross section of a portion of the preferred embodiment of the invention, as shown in FIG. 1.

FIG. 2 shows a detailed cross section of a portion of the preferred embodiment of FIG. 1, in which a slurry 30 of solids 4 and liquids 6, e.g., sludge and water, is contained in a settling pond with an earth floor 2 and is covered by a laminate or sandwich 8 of an aggregate material 32 contained between two layers of non-woven fabric 34 and 36. This laminate is covered by a heavy overburden of clay 20, which provides sufficient additional weight to press the laminate into the slurry 30. Liquid is thus filtered through the lower layer 34 of non-woven fabric and enters the aggregate layer 32, but the liquid is retained within the aggregate layer 32 by the top layer of fabric 36 and the clay 20, which is impermeable to liquid. Liquid is extracted from the aggregate layer 32 by perforated tubes 10 with perforations 11 which pass through this layer, or can be allowed to simply drain through the aggregate layer 32 to a sump or collector 18 along the edges of the pond (as shown in FIG. 1), where it is pumped out. More than one aggregate layer can be provided as a laminate in combination with multiple layers of fabric. As liquid is removed from the aggregate layer 32, the laminate is pushed further into the slurry 30, and finally will rest atop a nearly liquid-free layer of separated solids 4. For maximum effectiveness, the edges of the laminate material should reach or overlap the edges 5 of the settling pond and should be anchored to sideboards or the like which line the circumference of the pond. Once the liquids have been separated and removed, the laminate material can be left in place on top of the de-watered sludge and fill dirt can be placed thereon for land recovery purposes. Alternatively, means can be provided for the temporary removal of the laminate material so that more slurry materials may be dumped into the pond and the process repeated. Dependent upon the size of the pond, the density and viscosity of the slurry and other factors, it may be desirable to provide mechanical support or means for exerting pressure on the top of the layer.

Figure 3:
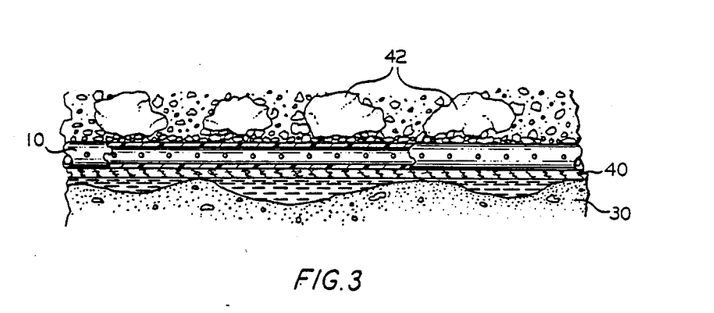
FIG. 3 is a fragmental cross section of another preferred embodiment of the invention.
Figure 5:
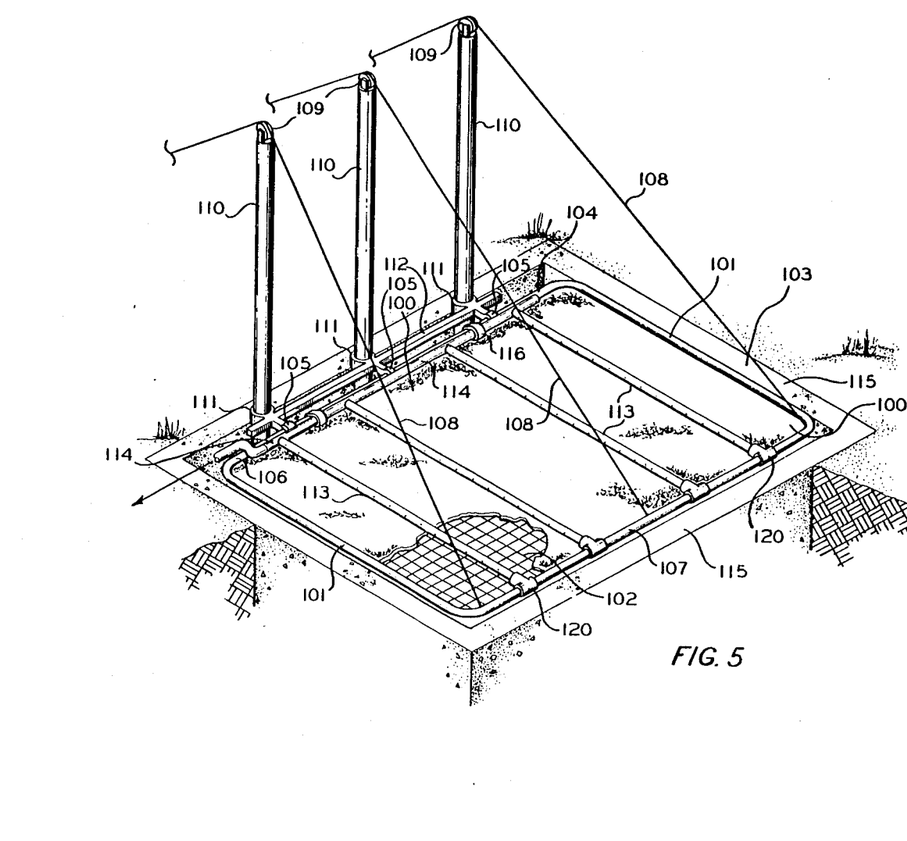
FIG. 5 is an isometric view of an embodiment of the invention which permits the removal of the fabric from the slurry surface.

FIG. 3 shows a simpler preferred embodiment which may be preferable when additional slurry material is to be added periodically to the settling pond. A layer of non-woven fabric 40 is placed atop the slurry or sludge materials 30 in a settling pond, and is weighted down by a series of discrete or relatively continuous and water-permeable weights, e.g., a mixture of aggregate and larger stones 42. Optionally, mechanical means of support or weighting can be provided, such as frames, grates, bars and the like, similar to frame and wire mesh shown in FIG. 5. Perforated tubes 10 are passed along the top of the non-woven fabric 40 so that the liquid can be pumped off as it is separated and filtered through the fabric 40. Such tubes may be permanent, semi-permanent or inserted only for removing the liquid on specific occasions. They are preferably made of rigid, semi-rigid or flexible plastics such as polyvinyl chloride, polypropylene or polyethylene. The perforations should be of a size and spacing such that liquid can be effectively pumped or drained from the tubes without clogging the perforations. This embodiment can be arranged so that the fabric can be physically removed periodically from the surface of the pond, allowing new slurry or sludge materials to be added to the pond. For instance, the non-woven fabric can be mounted in a frame 101 or supported by mechanical means such as mesh, grates or bars 102 of suitable materials as shown in FIG. 5, which is discussed in more detail below. For instance, if a frame of suitable rigidity for the weight of the damp fabric is provided it could be hoisted from one or more sides to allow additional slurries to be added. Also, if lateral weighting and stiffening bars were provided for a layer of such fabric, the fabric could be stored upon a roller and unrolled across the pond as if using a window shade, then secured to the opposite side of the pond when in use. To store the fabric on a roller in such a manner, it may be required to scrape off accumulated sludge as the fabric is rolled up.

Numerous alternative embodiments can be provided, utilizing the principle of forcing at least one layer, e.g., liquid-permeable fabric into a slurry or mixture of solids and liquids so that the liquid is separated and can then be removed, leaving the separated solids below the fabric.

Figure 4:
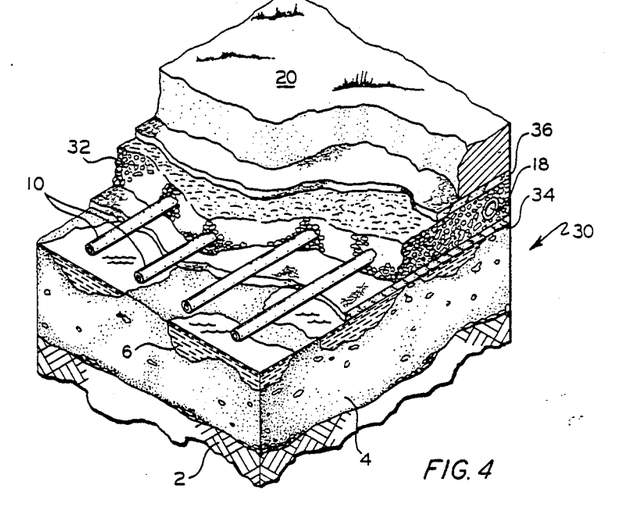
FIG. 4 is a fragmental cross section isometric view of the preferred embodiment of FIG. 2, with the addition of a common removal sump positioned in the aggregate layer.

In FIG. 4, a plurality of liquid extraction tubes 10 are spaced across the width of the laminate and are connected to a common removal sump 18. In this variation of the embodiment, the non-woven layers 34 and 36 are not in liquid contact with sump 18, but simply enclose the aggregate layer 32. Said sump 18 can also be made of rigid, semi-rigid, or flexible plastic such as polyvinyl chloride, polypropylene or polyethylene.

Also a more detailed view of the layers is shown. An earthen floor 2 having slurry 30 composed of liquid 6 and solids 4 thereon is covered by a non-woven fabric layer 34. An aggregate layer 32 surrounds the liquid removal tubes 10 and sump 18, with a second non-woven layer 36 spaced between said aggregate layer 32 and clay cover sealing layer 20.

In FIG. 5 a reuseable filtering means allowing slurry to be added and/or dried sludge to be removed from a settling pond or fill area is given. A non-woven filter material 100, such as the embodiment of the invention shown in FIG. 3, is supported within metal frame 101 (preferably aluminum tube) by means of mesh 102 (such as galvanized wire mesh) over a sludge containing area with walls 115. Said frame 101 and wire mesh 102 are so constructed as to present a rigid integral structure 103. Said structure 103 is supported along side 104 by pivotal ring attachments 105 which allow for rotation of tube 106 within said rings 105. The opposite side 107 of structure 103 has lifting means 108 attached along the length thereof for both maintaining said structure 103 while in the horizontal filtering position and in the vertical raised position. Lifting means 108 preferably comprise tempered steel wire capable of withstanding at least as much tension as is generated while lifting. Lifting wires 108 are routed through fixed pulleys 109 mounted atop poles 110 and extend to motorized windlass means not shown.

In addition, the structure 103 pivotal support means 105 are slideably attached by ring members 111 through bar means 112 to vertical rigid poles 110. Said poles 110 (preferably telephone type poles) are the main supporting means for structure 103 and extend to a height sufficient to allow said frame 101 to be raised almost vertical. The slideable ring 111 are moveable vertically along poles 110 by motor means not shown and can be secured in place by clamps, pins or other conventional means not shown. The poles 110 and rings 111 are placed so that structure 103 can be lowered into contact with the surface of the sludge.

In completion of the invention, liquid removal means 113 extend across the surface of filter mat 110 and connect to manifold tube 114 which is connected to a disposal reservoir and pumping means not shown. Said liquid removal means 113 are preferably perforated tubes closed at the end opposite manifold tube 114 and attached to frame members 106 and 107 by conventional mechanical means 116 and 120 to prevent excessive flexing or sagging.

In operation, the non-woven fabric, wire mesh, metal frame structure 103 is raised almost vertical. Saturated sludge is placed within the sludge containment area walls 115 and the structure 103 is lowered to a horizontal position. Then motor means not shown are operated to lower structure 103 down poles 110 into contact with the surface of said sludge. Liquid is filtered through mat 100 into fluid contact with tubes 113. Tubes 113 then are used to remove the filtered liquid through manifold 114 by pumping or draining. After deliquefaction, additional sludge can be added and/or the dried sludge removed by raising and pivoting the filter structure 103 as described above.

The sludge containment area can be a small area, substantially covered by the filter structure 103, or can merely be a small portion, preferably a corner, of a much larger sludge area which is otherwise covered by filter means such as other embodiments of this invention. In the latter case, this permits the addition of wet sludge and/or the removal of deliquefied sludge without disturbing the layers of filter material which substantially cover the remainder of the sludge area. Thus, the entire surface of the sludge need not be exposed, reducing losses of liquid by evaporation, contamination of the atmosphere, etc.

Many types of fabrics can be used as the liquid-permeable fabrics of this invention, e.g., woven, non-woven or felted fabrics, with some types preferred for particular applications. For example, the fabric must not be dissolved, oxidized or weakened significantly by the liquid-solid slurry with which it comes in contact, at least during the consolidation period, but where the filtering means are to be left in place as part of a landfill, it can be advantageous to use fabrics comprising biodegradable fibers of natural or synthetic materials. Thus, fabrics useful in this invention can comprise fibers of natural, synthetic or processed inorganic materials, e.g., jute, hemp, polymers, fiberglass, metals, carbon, asbestos, etc. Tests have shown that certain nonwoven fabrics display excellent characteristics for such applications, including good hydraulic conductivity, non-clogging, low cost, availability and ease of handling. Furthermore, such nonwoven fabrics are very effective in reducing color and turbidity in a filtered liquid. See, e.g., U.S. Pat. No. 4,222,877, column 1. Certain of these non-woven fabrics also provide good tensile strength and are available in large sheets or rolls which facilitate their use in large scale settling ponds or the like. Advantages of this invention include the faster dewatering of such settling ponds and the reduction in the surface area required for the disposal of a given amount of slurry of solids containing solids and liquids.

The most preferred materials for use as such liquid-permeable fabrics are presently the non-woven polypropylene fabrics comprising needle punched, staple fibers, fused on one side, unfused, fused on both sides or double fused on one side, produced and marketed by the Phillips Fibers Corporation as Petromat ®, Duon ®, or Supac ®. These fabrics display excellent filtration characteristics, as described more fully herein, will not rot and are not attacked by most chemicals. Since the fabric has random fiber orientation, it offers desirable multi-directional properties of elongation and tensile strength and resists tears or punctures. This fabric is conventionally marketed in rolls, in widths up to 15 feet and lengths of up to 300 feet, and can be fabricated to order in desirable widths and lengths. Sections of such fabric can be joined in a seam by sewing using, e.g., a portable air-operated sewing machine.

Since commercial polypropylene fibers are wettable and wick rapidly due to the presence of hydrophilic lubricants on the surface of the fibers, these fabrics provide the advantage of wicking liquids from a slurry with which they are placed in contact onto the "liquid side" for draining or pumping. Other wettable fibers, natural or synthetic, are also useful in this respect. Examples include acrylic and rayon fibers.

In operation, the liquid-permeable fabrics of this invention are forced or pressed so as to descend into the slurry by gravity or other means so that the liquid passes up through said fabric with the solids remaining below; the liquids can then be removed from above the fabric. Although water is the most common waste liquid encountered in the industries mentioned above, this invention is also applicable to the separation of solids from oils, organic or inorganic liquids, liquid chemicals, and acids or mixtures thereof with water, so long as the liquids involved are compatible with the fibers of the fabric material. (For instance, some asbestos materials are soluble in acids, and polypropylene can be dissolved by chemicals including chlorinated hydrocarbons comprising perchloroethylene, hot mineral oil, xylene and decalin.)

The ability of the preferred fabrics of this invention to reduce color and turbidity in the filtrate liquid is of particular advantage in dewatering slurries of environmentally offensive wastes.

Since some of these liquids have greater effect on the synthetic fibers of such fabric materials when heated, the separation process of this invention are preferably carried out at ambient temperature. However, such processes can be carried out at temperatures below the softening temperature of, e.g., the polypropylene fibers, provided the operating temperature is below the boiling point of the liquids involved.

The solid material separated from such liquids can be particulate, granular, gelled or flocculated materials, crystals, dusts, sludge, or gels such as for example sand, sulfur particles, carbon black, clays and the like. The liquid-permeable fabrics of this invention can be supported and/or pressed down upon the slurries by mechanical means comprising grates, bars, frames, sideboards, overburdens of water-permeable weighting materials such as gravel or aggregates, or water-impermeable overburdens such as clay. Once the liquids have passed through said fabric the liquids can be removed by any suitable means, such as for example by draining, pumping, absorbing, evaporating and the like. When this invention is practiced in vessels for industrial or laboratory use, liquids can also be removed by decanting, vacuum distillation or other suitable means known in the art. Some embodiments of the water-permeable weighting means can include aggregates comprising gravel of pea size or larger, crushed concrete, spent oil shale, smelter slag, etc.

Where it is desirable to separate and remove the liquids from a slurry without allowing the surface of the separated liquid to be exposed to the atmosphere, a top overburden layer can be provided of a clay such as bentonite, a montmorillonite clay which absorbs water or small polar organic molecules, then swells and becomes impermeable to liquids. This is of particular advantage where it is important to remove or recover all the liquid from the slurry, rather than allowing it to escape and contaminate the surrounding ground or atmosphere.

ILLUSTRATIVE EMBODIMENT

Although the following embodiment has not been constructed, appropriate details are provided to further illustrate how the invention can be practiced.

A hypothetical sludge pond has the dimensions of 200° wide by 280′ long totaling a 56,000 sq. ft. effective surface area. Said pond is covered by 5 oz. per sq. yd., lightly fused on one side, nonwoven polypropylene fabric such as Supac ®, sold by Phillips Fibers Corporation of Greenville, SC. The fabric cover is constructed from twenty-two 10′ wide by 300′ long sections sewn together by an air operated sewing machine and overlapping 1″ at the seams for a total effective surface area of (218′3″ by 300′) 65,475 sq. ft. The fabric extends 9′1¼″ onto the soil at pond edge in the width direction and 10″ onto the soil at pond's edge in the length direction. Said material has a rupture strength minimum of 295 lbs. per sq. inch over the fabric body and approximately 265.5 lbs. per sq. inch over the seams. The fabric is 70 mils (0.07″) thick and has a water permeability rate of 0.086″ per sec. Said fabric is covered by gravel or conglomerate concrete to the thickness of 4″, having a weight of 0.348 lbs. per sq. inch at that thickness. The gravel or concrete layer is covered by a second layer of the same 5 oz. fabric which is covered by 10″ of Bentonite clay weighing 0.63 lb. per sq. inch at that thickness, comprising 10% water by weight. Based on the permeability rate found using ASTM 751 and the effective surface area of 8,064,000 square inches, the total effective filtration rate over the surface of the fabric is 3064 gal. of water per sec. Also based on the sum of the individual weights, the total amount of weight pushing on the fabric per sq. inch is about 1 lb. per sq. inch, including the clay and the aggregate. The water filtrate is removed from above the pond by a plurality of perforated polyethylene tubes or pipes such as are sold under the trademark Driscopipe ® by Phillips Discopipe, Inc. of Dallas, Tex. Pipes of a diameter in the range from about 0.5 to about 1.5 inches are suitable, and perforations of about 0.1 to about 0.3 inches can be spaced so that there are from 10 to 30 perforations per foot, distributed randomly or symmetrically around the periphery of the tubes. Said pipes can be manifolded into a common drain or sump along one edge of the pond and the water pumped away.

A UV stabilized nonwoven polypropylene fabric suitable for the practice of this invention, marketed by Phillips Fibers Corp. as Petromat ®, has the following relevant properties:

| | |
|---|---|
| Fiber Specific Gravity | 0.90–0.91 |
| Effect of Heat | Fiber softens at 300°–320° F., melts at 320° F.–340° F. |
| Flammability | Classed as very slow burning. |
| Effect of Solvents | Some chlorinated hydrocarbons cause slight swelling at room temperature and dissolve polypropylene at 160° F. or above. Fiber is insoluble in aliphatic alcohols, glycerine, ether, carbon disulfide, acetone, trichloroethane, trichloroethylene and methylene chloride. Hot perchloroethylene, mineral oil, xylene (140° C.) or decalin (100+° C.) will dissolve polypropylene. UV stabilization prevents the fabric from weakening due to outdoor exposure. |

For a thickness of 40–100 mils, to be specified, properties are as follows:

| | |
|---|---|
| Weight, oz./sq. yd. | About 4–6 |
| Tensile strength, lbs (ASTM D1682) min | 90 to about 115 nominal |
| Elongation at break, % (ASTM D1682) | 55 to 65 |
| Burst strength (Mullen) ASTM 751 | 350 lb./sq. in. (90% of this for sewn seams) |

While it is not intended to limit the invention by such decription, examples of such settling ponds can cover 1 to 15 acres at 4 to 25 feet depth, and take 1 month to a year or more to de-water.

While this invention has been described in detail for the purpose of illustration, it is not to be construed as limited thereby, but it is intended to cover all the changes and modifications within the spirit and scope thereof.

I claim:

1. Apparatus for separating liquid from solids suspended in a slurry of said solids and said liquid, comprising:
    slurry-containing means for containing a quantity of said slurry while said liquid and said solids are separated;
    filtering means disposed at least partially within said slurry-containing means for passing said liquid therethrough, said filtering means having a top surface and a bottom surface and comprising at least one layer of a liquid-permeable fabric consisting essentially of fibers compatible with said liquid to be separated from said quantity of said slurry;

weighting means operatively engaging said filtering means for creating sufficient negative buoyancy to cause said filtering means to descend into said quantity of said slurry whereby liquid from said quantity of said slurry is passed from said quantity of said slurry through said at least one layer of liquid-permeable fabric and is thereby separated from said quantity of said slurry;

wherein said weighting means comprises at least one layer of aggregate disposed over at least one of said at least one layer of a liquid-permeable fabric for providing a drainage channel for liquid which has passed through said at least one liquid-permeable fabric and has been thereby separated from said quantity of said slurry; and liquid removal means communicating with said layer of aggregate for removing said liquid which has passed through said filtering means.

2. Apparatus in accordance with claim 1 wherein said liquid removed means includes means for removing said liquid by pumping, drainage or evaporation as said liquid is separated.

3. Apparatus in accordance with claim 2, wherein said liquid removal means comprises perforated tubes contained within said aggregate layer.

4. Apparatus in accordance with claim 3, wherein said filtering means comprises two layers of said fabric and wherein at least one of said at least one layer of aggregate is disposed between said two fabric layers.

5. Apparatus in accordance with claim 4, further comprising a manifold in fluid connection with said perforated tubes.

6. Apparatus in accordance with claim 2, further comprising means for removing said filtering means from said solids after said liquid has been separated from said quantity of said slurry by said filtering means and removed.

7. Apparatus in accordance with claim 6, wherein said filtering means further comprises a rigid support structure and said means for removing said filtering means comprises means for raising said structure.

8. Apparatus in accordance with claim 1, wherein said weighting means comprises at least one layer of liquid-impermeable material disposed over said filtering means as liquid-impermeable means for providing a fluid-retentive top layer.

9. Apparatus in accordance with claim 8 wherein said filtering means is arranged to completely cover said quantity of said slurry and said liquid-impermeable material is clay and seals the top surface of said filtering means.

10. Apparatus in accordance with claim 1, wherein said filtering means comprises mechanical means selected from the group consisting of gratings, bars, frames and weights.

11. Apparatus in accordance with claim 1, wherein said means for containing said slurry is a settling pond or a vessel for an industrial or laboratory process.

12. Apparatus in accordance with claim 1, wherein said fabric is a non-woven synthetic or inorganic fabric.

13. Apparatus in accordance with claim 1, wherein said fabric is a non-woven synthetic fabric comprising needle punched synthetic staple fibers which are either unfused or fused on at least one side.

14. Apparatus in accordance with claim 13 wherein said fibers comprise polypropylene.

15. Apparatus in accordance with claim 13 wherein said fabric has random fiber orientation.

16. Apparatus in accordance with claim 1, wherein said fabric is woven of fibers selected from the group consisting of natural, inorganic and synthetic fibers and combinations of any two or more thereof.

17. Apparatus in accordance with claim 1 wherein said aggregate is selected from the group consisting of gravel, crushed concrete, spent oil shale, smelter slag and combinations of any two or more thereof.

18. Apparatus in accordance with claim 1 wherein said filtering means comprises means for completely covering said quantity of said slurry.

19. Apparatus for separating liquid from solids suspended in a slurry of said solids and said liquid, comprising:

slurry-containing means for containing a quantity of said slurry while said liquid is separated from said solids;

laminated filtering means disposed at least partially within said slurry-containing means, said filtering means having a top surface and a bottom surface and comprising at least one layer of aggregate material, each said layer of aggregate material being contained between two layers of liquid-permeable fabric each having outer edges;

weighting means operatively engaging said laminated filtering means for creating with said aggregate material sufficient negative buoyancy to cause said filtering means to sink into said quantity of said slurry to the extent that liquid from said quantity of said slurry is passed from said slurry through at least one of said layers of liquid-permeable fabric while solids from said quantity of said slurry are prevented from passing from said slurry through the bottom surface of said filtering means thereby separating said liquid from said solids suspended in said quantity of said slurry; and means in fluid flow communication with said laminated filtering means for removing said liquid which has passed through said filtering means.

20. Apparatus in accordance with claim 19 wherein said aggregate material is selected from the group consisting of gravel, crushed concrete, spent oil shale, smelter slag and combinations of any two or more thereof.

21. Apparatus in accordance with claim 19 wherein said means in fluid flow communication with said laminated filtering means comprises means for removing said liquid by pumping, drainage or evaporation as said liquid is separated.

22. Apparatus in accordance with claim 21 wherein said means for removing liquid comprises a plurality of perforated tubes contained within at least one layer of aggregate material.

23. Apparatus in accordance with claim 19 wherein the outer edges of said layers of liquid-permeable fabric are merged to totally enclose said at least one layer of aggregate material.

24. Apparatus in accordance with claim 19 wherein the outer edges of said layers of liquid-permeable fabric are fastened to said means for cntaining said slurry so as to completely cover said quantity of said slurry.

25. Apparatus in accordance with claim 19 further comprising at least one layer of liqud-impermeable material disposed over the top surface of said laminated filter means as a fluid-retentive top layer and additional weighting means.

26. Apparatus in accordance with claim 19, wherein said liquid-permeable fabric is a non-woven synthetic or inorganic fabric.

27. Apparatus in accordance with claim 26 wherein said liquid-permeable fabric comprises needle-punched synthetic staple fibers which are either unfused or fused on at least one side.

28. Apparatus in accordance with claim 27 wherein said fibers comprise polypropylene.

* * * * *